(12) United States Patent
Baxter et al.

(10) Patent No.: US 7,777,879 B2
(45) Date of Patent: Aug. 17, 2010

(54) ROTARY ENCODERS

(75) Inventors: Patrick Baxter, Edinburgh (GB); Jeffrey Raynor, Edinburgh (GB)

(73) Assignee: STMicroelectronics (Research & Development) Ltd., Marlow - Buckinghamshire (GB)

( * ) Notice: Subject to any disclaimer, the term of this patent is extended or adjusted under 35 U.S.C. 154(b) by 645 days.

(21) Appl. No.: 11/670,179

(22) Filed: Feb. 1, 2007

(65) Prior Publication Data

US 2008/0186491 A1    Aug. 7, 2008

(51) Int. Cl.
*G01J 4/00* (2006.01)
(52) U.S. Cl. .................................... 356/364
(58) Field of Classification Search ............... 356/364; 250/559.09, 225
See application file for complete search history.

(56) References Cited

U.S. PATENT DOCUMENTS

| | | | | |
|---|---|---|---|---|
| 5,146,085 A * | 9/1992 | Ishizuka et al. | ........ | 250/231.16 |
| 5,237,388 A * | 8/1993 | Hirano et al. | ............... | 356/491 |
| 5,389,780 A * | 2/1995 | Anderson | .................... | 250/225 |
| 5,517,309 A * | 5/1996 | Barker | ........................ | 356/364 |
| 5,815,269 A * | 9/1998 | Crabb et al. | ................. | 356/364 |
| 5,886,350 A * | 3/1999 | Cook et al. | .................. | 250/225 |
| 7,304,294 B2 * | 12/2007 | Chin | ..................... | 250/231.13 |
| 2002/0125412 A1* | 9/2002 | Barnett | ...................... | 250/225 |
| 2003/0155489 A1* | 8/2003 | Yasuda et al. | ................ | 250/225 |
| 2008/0177139 A1* | 7/2008 | Courtney et al. | ............ | 600/109 |

* cited by examiner

*Primary Examiner*—Roy Punnoose
(74) *Attorney, Agent, or Firm*—Lisa K. Jorgenson; Allen, Dyer, Doppelt, Milbrath & Gilchrist, P.A.

(57) ABSTRACT

An optical rotary encoder uses polarization difference imaging techniques to calculate an angle of orientation of a rotatable member. The optical rotary encoder includes a light source, a polarization sensor that has a polarizer and image sensing structure, and a polarizer disk fixed between to the rotatable and interposed between the light source and the polarization sensor.

26 Claims, 10 Drawing Sheets

ROTARY ENCODERS

FIELD OF THE INVENTION

The present invention relates to the field of rotary encoders, that is, devices for measuring the angular position of a rotatable member by generating a digital signal that varies with the angular position of the rotatable member or other components which are fixed to or in connection with the rotatable member. The rotatable member can be a shaft of circular cross-section, which is rotatable to drive a device. The invention relates more particularly to the field of optical rotary encoders, that is, to rotary encoders that measure the transmission of light as part or all of the process of generating the digital signal that is representative of the angular position.

BACKGROUND OF THE INVENTION

Rotary encoders fall into three general categories, optical, magnetic and mechanical contact. Mechanical contact encoders require brush contacts, which are susceptible to wear and need replaced regularly. Magnetic encoders are contactless, but cannot be operated in some environments where the magnetic fields might interfere with other equipment. In general, optical encoders are the most widely used as they provide the highest accuracy and the best reliability per unit cost.

Within the field of optical rotary encoders there are two main types. The first is usually known as an incremental encoder and is illustrated in FIGS. 1a and 1b. As shown in the plan view of FIG. 1a, the rotary encoder comprises a disk 10 comprising alternating clear and opaque sections 12,14 around its circumferential edge. It is to be appreciated that the sections could be formed at any radial point on the disk, for example around a circle that is closer to the center than is illustrated here.

The disk can be formed from glass, plastic or metal among other materials, and the clear and opaque sections 12,14 can be formed by etching, printing, embossing or any other suitable method. The disk 10 is fixed to a shaft 16 which rotates in use. FIG. 1b shows a side view cross-section of the encoder. The disk 10 is interposed between one or more light sources 18 and one or more corresponding sensors 20 with associated circuitry, and positioned such that the light sources 18 and sensors 20 are arranged on either side of the circumferential edge comprising the clear and opaque portions 12,14.

As the disk 10 rotates, the intensity of light incident on the sensors varies as the clear and opaque patterns 12,14 pass the under the light sources 18 in sequence. The measured intensity is amplified or fed into a comparator to produce a sign wave or digital square wave. The pulses of this output are then counted by the circuitry associated with the sensors 20 to give positional information as the intensity of the light varies.

In order to yield an absolute angular position, a known a reference point must be provided. This can be in the form of a single opaque section 22 on an outer track of the disk 10 or by use of a separate mask component as is well known in the art. In one embodiment, a first light source and sensor pair is provided for detecting the varying intensity of the track comprising the alternating clear and opaque parts 12,14, and a second light source 18a and sensor 20a pair is provided for the detection of the reference point 22.

This type of optical rotary encoder requires only a small number of sensors and light sources. However, if the accuracy of the encoder is to be increased, this means that the number of etched lines need to form the alternating clear and opaque portions 12,14 must be increased. The increased complexity of etching raises the cost of the disk 10. A further disadvantage of this type of sensor is that if power is lost from the device, the stored absolute positional reference information is lost.

The second type of optical rotary encoder is an absolute encoder, an example of which is illustrated in FIG. 2. A similar disk 30 is fixed to a rotatable shaft 32. However, in this case the patterns formed on the disk 30 are more complicated, comprising a number of tracks T1-T5 which are formed as non-overlapping annuli each of which is concentric with the central axis of rotation of the disk 30 which runs perpendicular to its surface. Each track T1-T5 comprises alternating clear and opaque portions 34,36. These portions are arranged such that successive angles of rotation yield unique patterns of alternating clear and opaque portions across the five tracks T1-T5. The code formed from the pattern can for example be a binary code, or a gray code implementation such as that illustrated, where only one bit of code varies between successive segments. This helps minimize errors caused when the angle is close to the borderline between segments of the circle, or errors due caused by the alignment errors of the light sources and sensors. The code generated can give the position of the shaft, and successive readings can be used to calculate its speed and direction.

Light sources 38 and sensors 40 are provided as before, but in this case a separate light source 38 and sensor pair 40 is provided for use with each track. Each track provides one bit of code. In the illustrated example, a five bit code is generated by the five tracks T1-T5. This means that the maximum number of angles that can be detected is $2^5-1$, that is, thirty-one. The disk 30 is thus divided into thirty-two different segments. When the disk is at a particular angular location a unique code is generated which gives direct absolute positional information from start up.

To increase the accuracy of such an encoder, additional tracks are needed which increases the complexity of etching required to fabricate the encoder disk. It is to be appreciated that the illustrated example is not limiting, and that a rotary encoder of this type will typically comprise more tracks, or could comprise less.

As mentioned, the advantage of this type of encoder is that it gives an absolute positional information from start up. However, as compared with the incremental encoder, it requires an increased number of sensors and light sources. The production of the etched disk is also relatively expensive as compared with the incremental encoder.

It is therefore an object to provide an optical rotary encoder which is more simple to manufacture. Other objects will be apparent from the context of this application as a whole.

SUMMARY OF THE INVENTION

The present invention is concerned with providing an optical rotary encoder that makes use of polarization difference imaging techniques to provide orientation information.

According to a first object, an optical rotary encoder for measuring the angular position of a rotatable member comprises a light source; polarization sensing means or a polarization sensor comprising a polarizer and an image sensing structure; and a polarizer disk fixed to the rotatable member and interposed between the light source and the polarization sensing means. The light source may emit unpolarized light, and the polarization sensing means may comprise processing means or a processor for obtaining an intensity signal and comparing that with the known variation of intensity with angle of rotation of the rotatable member in order to determine one or more angles of rotation that correspond to the measured intensity.

The polarizer of the polarization sensing means can in one embodiment polarize light in a single direction of polarization, or alternatively it may comprise a first polarizing section for polarizing light in a first direction and a second polarizing section for polarizing light in a second direction, wherein the first and second directions are orthogonal to each other. Still further, the polarizer of the polarization sensing means may comprise four polarizing sections comprising two sections of each direction of polarization in a common centroid arrangement, the arrangement being repeatable a number of times across the surface of the polarizer.

The image sensing structure can comprise an image sensing pixel array in a number of different formats. For example, one image sensing pixel is provided for each polarizing section. Alternatively, a plurality of image sensing pixels are provided for each polarizing section. This is the case both when there are a small number of polarizing sections in the arrangements mentioned above, and when a pattern of polarizing sections is repeated to form a polarizing array. The polarizer disk is formed from h-sheet polaroid material or from j-sheet polaroid material, both of which are readily available and relatively cheap. Other suitable polarizing material can be used.

The polarizer of the polarization sensing means can be integrated with the image sensing structure, in which case the polarizer can comprise a plurality of parallel metal lines formed directly on a surface of the image sensing structure. These provide the appropriate diffractive effects to yield a polarization effect. Alternatively, the polarizer of the polarization sensing means can be provided as part of an optical stack provided for the image sensing structure. In this case, the polarizer of the polarization sensing means may comprise h-sheet polaroid material or j-sheet polaroid material, or again, any other suitable polarizer material. Any type of image sensor, for example CMOS or CCD may be used as part of the image sensing structure, but one option may use one or more light to frequency convertor type pixels.

In some embodiments, a secondary orientation sensor may be provided for uniquely identifying the quadrants of the polarizer disk. This can for example comprise two tracks formed on the polarizer disk, together with an image sensor associated with each track formed as part of the polarization sensing means. Each of the tracks can comprise alternating clear and opaque portions, suitably gray coded with respect to the signals detected by the image sensors with the tracks between successive quadrants of the polarizing disk.

Alternatively, the secondary orientation sensor may comprise a single track formed on the polarizer disk, together with an associated image sensor formed as part of the polarization sensing means; and a polarizer formed as part of the polarization sensing means that comprises: first and second polarizer sections which have respective orthogonal directions of polarization, third and fourth polarizer sections which have respective orthogonal directions of polarization, wherein the directions of polarization of the first and second sections are offset with respect to the directions of polarization of the third and fourth sections by forty-five degrees.

According to a second object, there is provided an optical rotary encoder for measuring the angular position of a rotatable member comprising: a light source; polarization sensing means or a polarization sensor comprising a polarizer integrated with an image sensing structure; and a polarizer disk fixed to the rotatable member and interposed between the light source and the polarization sensing means. The polarizer may suitably comprise a plurality of parallel metal lines formed directly on a surface of the image sensing structure.

According to a third object, there is provided an optical rotary encoder for measuring the angular position of a rotatable member comprising: a light source; polarization sensing means or a polarization sensor comprising a polarizer and an image sensing structure; a polarizer disk fixed to the rotatable member and comprising two tracks of alternating clear and opaque portions, the disk being interposed between the light source and the polarization sensing means; and wherein the polarization sensing means is further provided with two image sensors, each for association with one of the tracks on the polarizer disk. The clear and opaque portions may be in a gray code arrangement with respect to the signals detected by the image sensors with the tracks between successive quadrants of the polarizing disk.

According to a fourth object, there is provided an optical rotary encoder for measuring the angular position of a rotatable member comprising: a light source; polarization sensing means or a polarization sensor comprising a polarizer and an image sensing structure; a polarizer disk fixed to the rotatable member and interposed between the light source and the polarization sensing means; and wherein the image sensing structure comprises one or more light to frequency convertor type pixels.

According to a fifth object, there is provided a method for measuring the angular position of a rotatable member comprising the steps of: polarizing a light signal through a polarizer disk that rotates with the rotatable member and has a single direction of polarization; performing a further polarization step in at least one direction of polarization; measuring the intensity of light transmitted after the further polarization step; and calculating an angular position based on the comparison of the measured intensity with a known polarization variation. The light signal may be preferably provided from a light source that emits unpolarized light.

The further polarization step can act to polarize light in a single direction of polarization, or alternatively to polarize light in a first polarizing direction and in a second polarizing direction, wherein the first and second directions are orthogonal to each other. The image sensing structure may provide separate readout channels for each of the different polarization directions. The step of measuring the intensity of light may include performing a light to frequency conversion, or can involve the use of any other suitable imaging architecture.

The method may further comprise a secondary orientation step, comprising establishing a unique identification of the quadrants of the polarizer disk. This can for example be achieved by reading out a first intensity signal transmitted through a first track formed on the polarizer disk and a second intensity signal transmitted through a second track formed on the polarizer disk. The tracks in this case can comprise alternating clear and opaque portions, which may be a gray code arrangement with respect to the signals detected from the tracks between successive quadrants of the polarizing disk.

Another way of achieving the secondary orientation step would be to read out a first intensity signal transmitted through a first track formed on the polarizer disk, in which case the further polarization step comprises polarizing light through first and second polarizer sections which have respective orthogonal directions of polarization and third and fourth polarizer sections which have respective orthogonal directions of polarization, wherein the directions of polarization of the first and second sections are offset with respect to the directions of polarization of the third and fourth sections by forty-five degrees; and wherein separate readout channels are provided for each of the four polarizer sections.

According to further objects, there is provided a printer or photocopier, optical pointing device, aeronautic telemetry system or automotive telemetry system comprising a spool fitted with an optical rotary encoder for measuring the angular position of the spool, the encoder comprising: a light source; polarization sensing means or a polarization sensor comprising a polarizer and an image sensing structure; and a polarizer disk fixed to the rotatable member and interposed between the light source and the polarization sensing means.

DETAILED DESCRIPTION OF THE PREFERRED EMBODIMENTS

Figure 1:
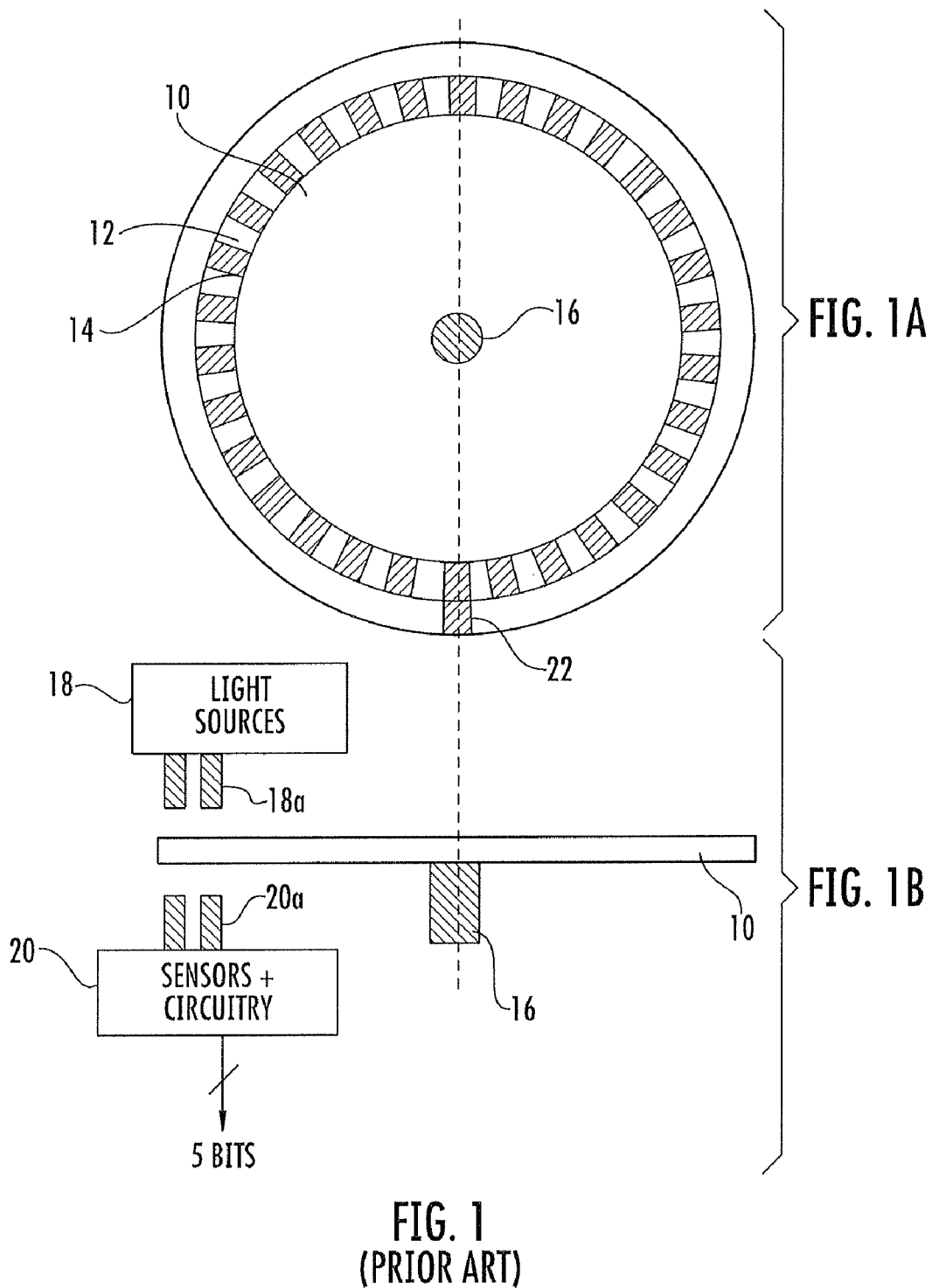
FIG. 1 illustrates a prior art incremental optical rotary encoder.
Figure 2:
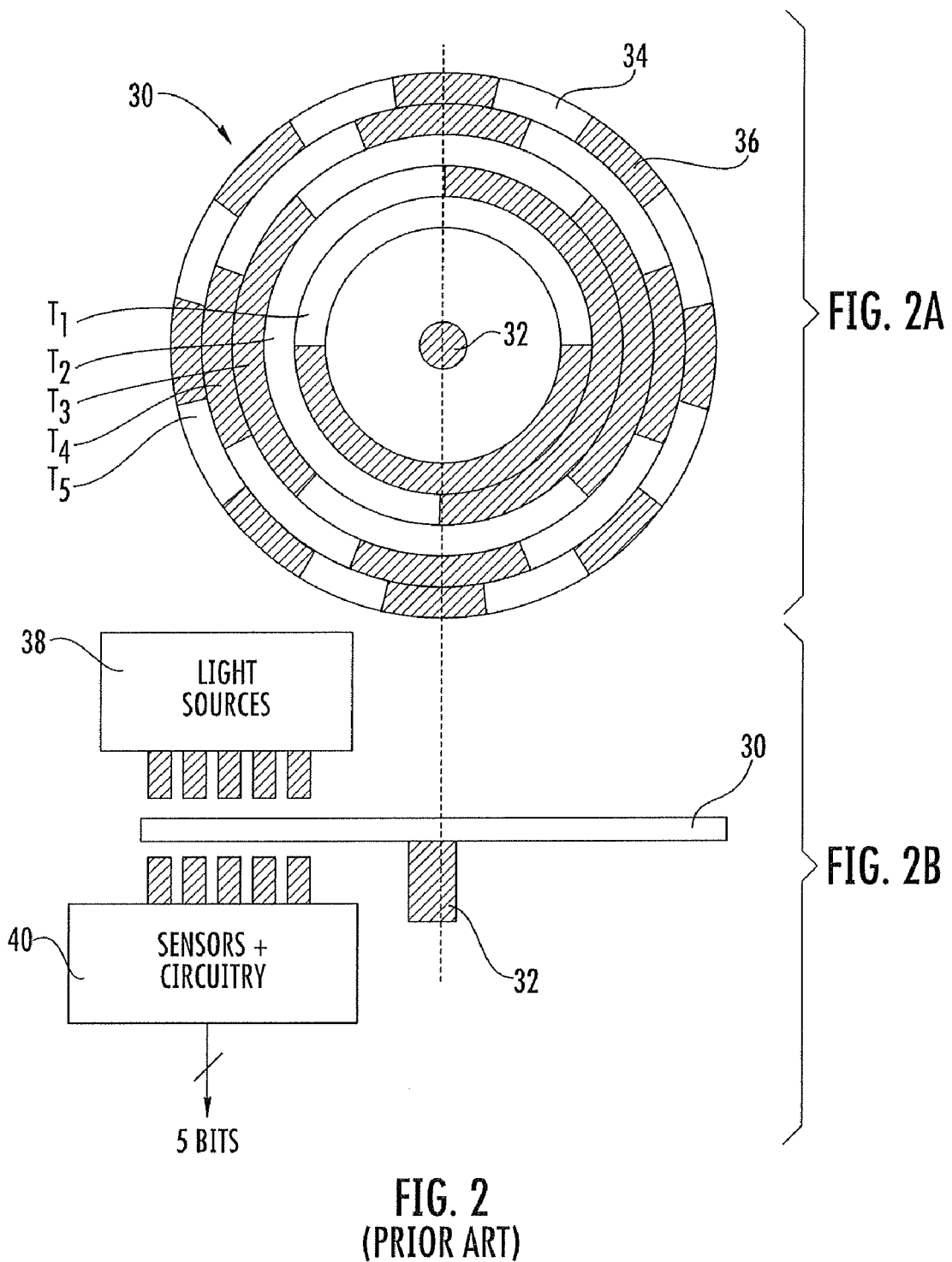
FIG. 2 illustrates a prior art absolute optical rotary encoder.
Figure 3:
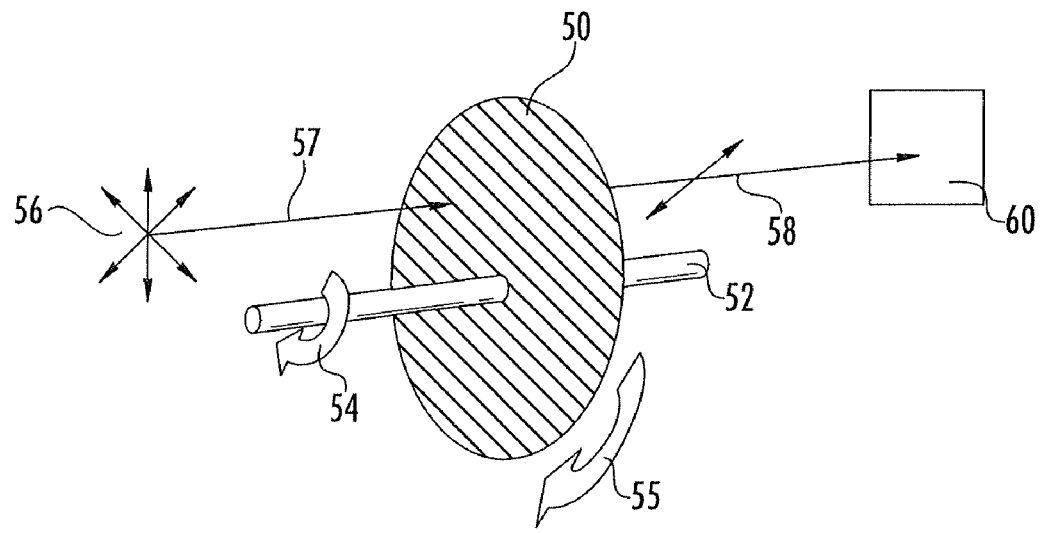
FIG. 3 illustrates an example of a new optical rotary encoder according to the invention.

FIG. 3 illustrates a first embodiment of an optical rotary encoder. A polarizer disk 50 is fixed to a shaft 52 which rotates about its axis as shown by arrows 54,55. A light source 56 emits randomly polarized light 57 (also called "unpolarized" light, as there is no defined or discernible direction of polarization) which passes through the polarizer disk 50 such that polarized light 58 is incident on a polarization sensing means or a polarization sensor 60 which monitors the direction of polarization of the incident light. The polarization sensing means comprises a polarizer, an image sensing structure and a processing means or a processor. The processing means calculates the orientation of the shaft based on a measured polarization contrast which is based on the intensity of the incident light, and is discussed in more detail below.

The polarizer and the image sensing structure of the polarization sensing means can be formed as an integrated polarization sensitive image sensor by the formation of a wire grid array directly on the semiconducting structure of a CMOS image sensor, as discussed in U.S. patent application Ser. No. 11/154,330, the contents of which are hereby incorporated by reference. Alternatively, the polarizer can be a separate component that is inserted as an additional component in a standard image sensor's (e.g. CMOS or CCD) optical stack. In this case, any suitable polarizing material can be used, such as H-sheet or J-sheet Polaroid film.

Figure 4:
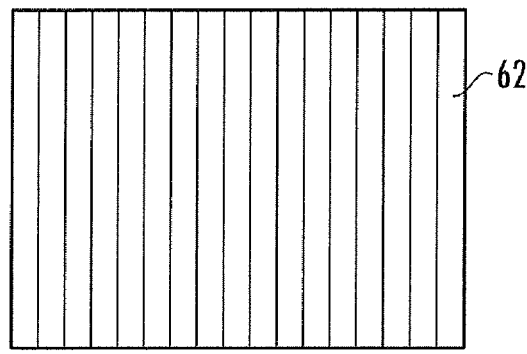
FIG. 4 illustrates an example polarizer forming part of a polarization sensing means according to the invention.
Figure 5:
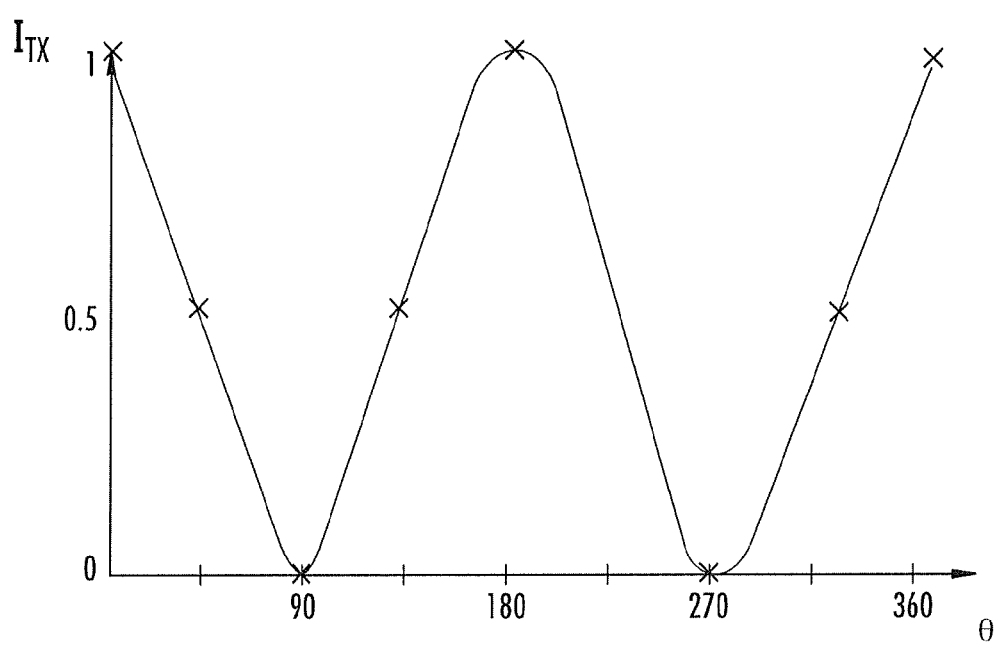
FIG. 5 illustrates the intensity of radiation detected by an image sensing structure after unpolarized light passes through a first polarizing disk and a second polarizer formed as part of a polarization sensing means, plotted against the angle of rotation of the polarizing disk according to the invention.

FIG. 4 shows an example of a polarizer suitable for use as part of the polarization sensing means. It comprises a polarizer 62 which polarizes light in a single direction. It can be formed as a wire grid with appropriate diffractive properties in the case of an integrated polarizer and image sensing structure, or it can be formed as a regular H-sheet or J-sheet in the case of non-integration of the polarizer and image sensing structure. The detected transmitted intensity $I_{TX}$ of radiation varies according to the angle of the polarizing disk 50 is sketched in FIG. 5, plotted according to an arbitrary scale, and where zero degrees indicates the position where the direction of polarization lines of the polarizer 62 is parallel with the direction of the polarization grating as seen in FIG. 4. The sketch assumes that the polarization action is ideal, which is of course not the case. However, the purpose of the sketch is for illustrative purposes only. The same applies to other figures in this application unless stated otherwise.

It can be seen that the intensity values repeat themselves every ninety degrees. Therefore over the course of a complete three hundred and sixty degree revolution, a given intensity could correspond to any one of four possible angles of orientation of the disk. Therefore, the system formed when the polarizer of FIG. 4 is used with the system of FIG. 3 can be used as an incremental type optical rotary encoder. It can be provided with a reference point in a known manner, together with associated light sources and image sensors and circuitry, so that the correct choice of angle can be determined. Alternatively, it may be use without a reference point to measure with accuracy small variations of angle, up to a maximum of ninety degrees.

Figure 6:
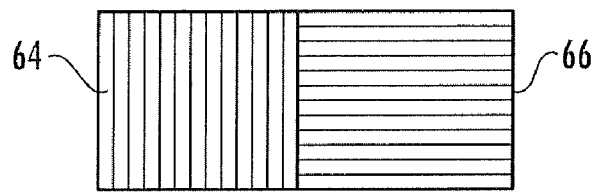
FIG. 6 illustrates a second example polarizer forming part of a polarization sensing means, comprising two polarizing sections according to the invention.

A second example of a polarizer that could be used as part of a polarization sensing means is illustrated in FIG. 6. Two polarizers 64,66 are provided which have orthogonal directions of polarization. The intensity of each polarizer is then measured independently. Again, the polarizers 64,66 can be formed as wire grids with appropriate diffractive properties in the case of an integrated polarizer and image sensing structure, or as a regular H-sheets or J-sheets in the case of non-integration of the polarizer and image sensing structure.

Figure 7:
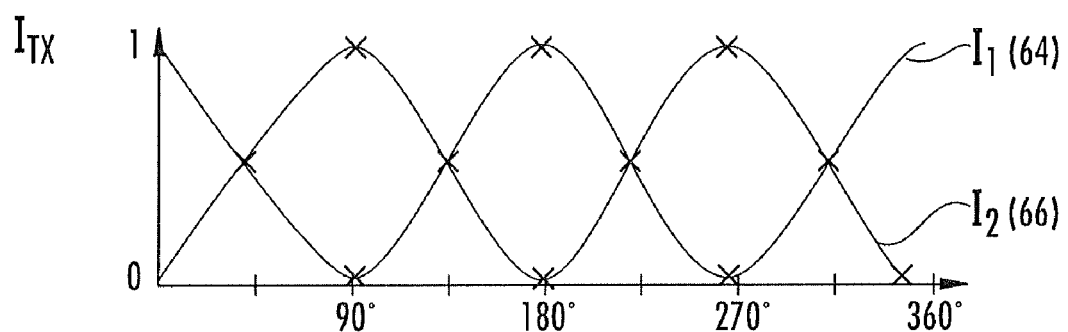
FIG. 7 illustrates the intensity of radiation detected by an image sensing structure after unpolarized light passes through a first polarizing disk and the polarizer of FIG. 6 formed as part of a polarization sensing means, plotted against the angle of rotation of the polarizing disk.
Figure 8:
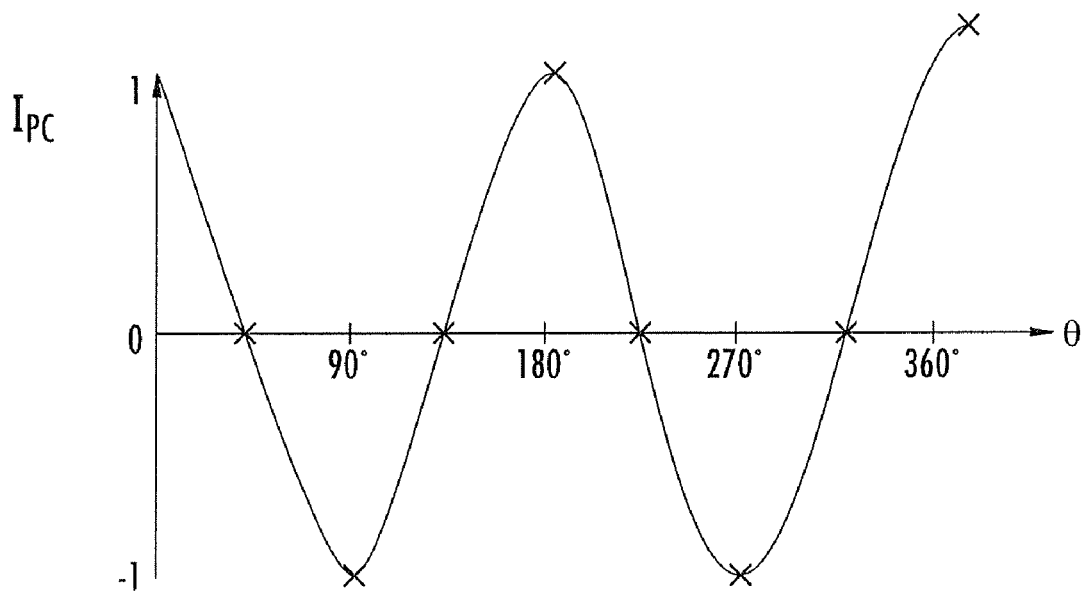
FIG. 8 illustrates the variation of a polarization contrast with the angle of the polarizing disk based on the intensities as shown in FIG. 7.

The intensity of light detected by each polarizer 64,66 varies with the angle of rotation of the shaft as shown in FIG. 7. The use of two orthogonal polarization directions enables a quantity called the polarization contrast to be measured. The polarization contrast is defined as $I_{PC}=(I_1-I_2)/(I_1+I_2)$. It is a measured intensity that varies according to the polarization of the incident light and is illustrated in FIG. 8 for the example of the polarizer shown in FIG. 6.

Figure 9:
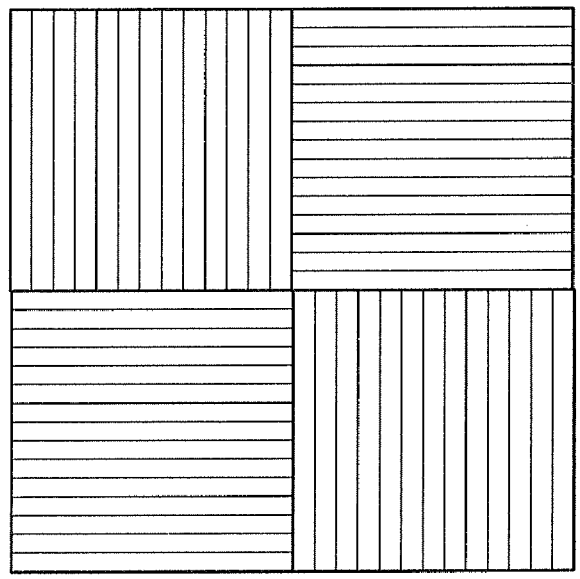
FIG. 9 illustrates a third example polarizer forming part of a polarization sensing means, comprising four polarizing sections arranged in a common centroid format according to the invention.

As a further modification the polarizer can be arranged in a common centroid format as shown in FIG. 9 which provides four polarizer sections to increase the accuracy of the readings by counteracting the effects of any intensity variations across the array. Again, the polarizers can be formed as wire grids with appropriate diffractive properties in the case of an integrated polarizer and image sensing structure, or as a regular H-sheets or J-sheets in the case of non-integration of the polarizer and image sensing structure.

A more complex polarizer can be formed by the repetition of the common centroid formation shown in FIG. 9 a number of times to further smooth the effects of any intensity variations across the array. For all of the above polarizer arrangements, image sensing pixels may be provided in a one-to-one relationship with each polarizing section. Alternatively, each polarizer section may have a plurality of pixels provided for measuring the intensity of radiation transmitted through each polarizer section. The processing means of the polarization sensing means may comprise a readout architecture in which a channel is defined for each polarization direction, either as a result of the column architecture of the pixel array, the timing of readout pulses or both.

When any of the above polarization sensing means polarizers are used with the polarizer disk 50 as shown in FIG. 3, a rotary encoder that may be used as an incremental counter is formed, as is discussed above. However, the system can be further provided with a secondary orientation sensor which may be used to remove this ambiguity.

Figure 10:
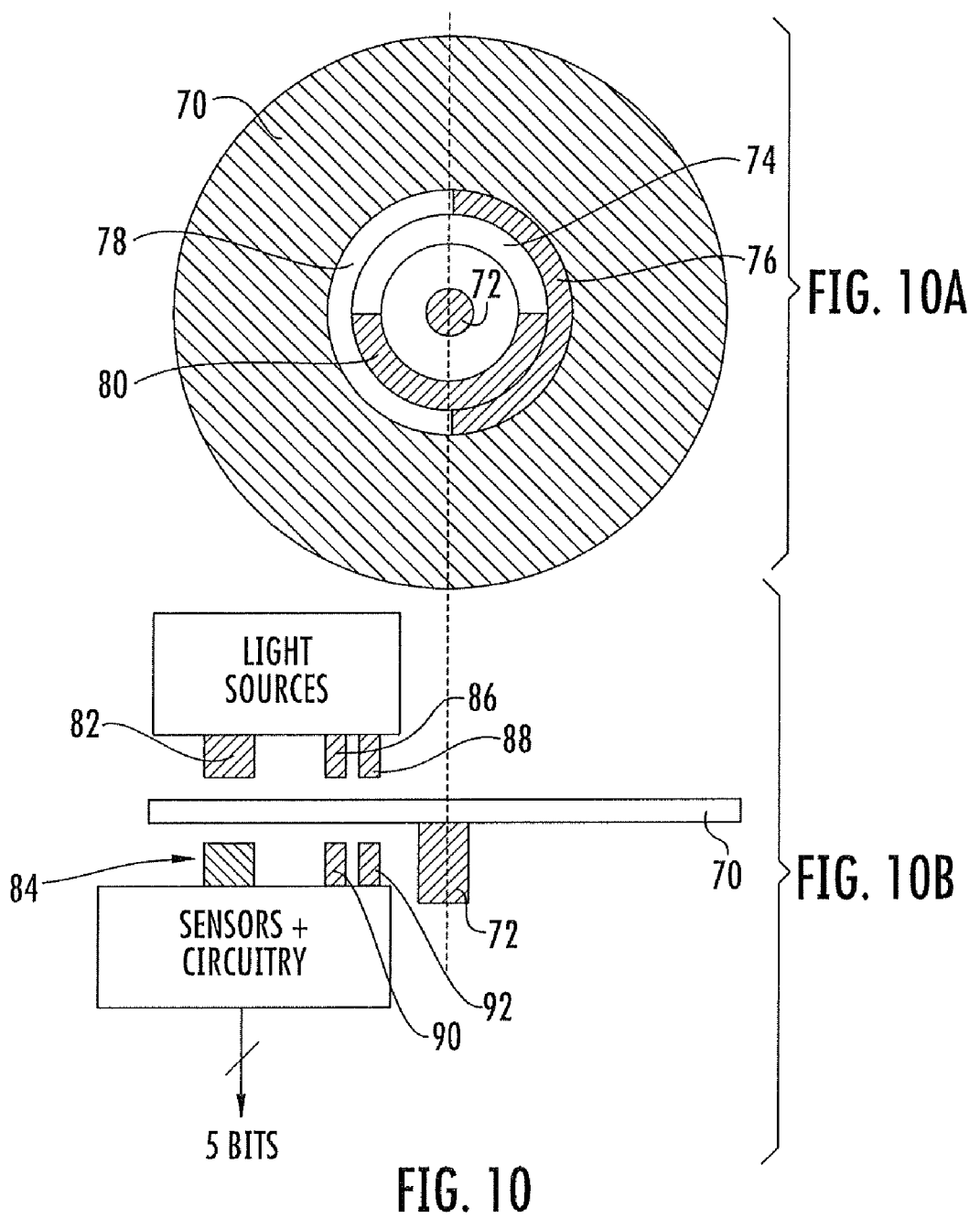
FIG. 10 illustrates a second example of a new optical rotary encoder according to the invention.

A first example of such a secondary orientation sensor is shown in FIG. 10. A polarizer disk 70 is fixed to a shaft 72 for rotation therewith, and is further provided with a first inner track 74 and a second outer track 76, each of which has alternately spaced clear and opaque portions 78, 80. The two tracks 74,76 are formed by etching, printing or embossing or any other suitable process on the polarizing disk 70. A first light source 82 is in arrangement with a polarization sensor 84 as described before, while two further light sources 86,88 are provided, together with corresponding sensors 90,92 for operation with the two tracks 74,76 in the manner as described above. The two tracks provide a two bit code, giving four possible values. These four values can be used to identify each quadrant of the disk 70, so that the correct angular value from the four possible solutions given by the measured $I_{PC}$ curve can be chosen.

The two additional grey code tracks provide absolute positional information which can be provided from start up. As compared with the above-mentioned standard prior art absolute rotary optical encoders, this embodiment provides a reduced number of sensors and light sources and a cheap encoder disk as only two tracks need to be encoded and these are of a simple instruction.

Figure 11:
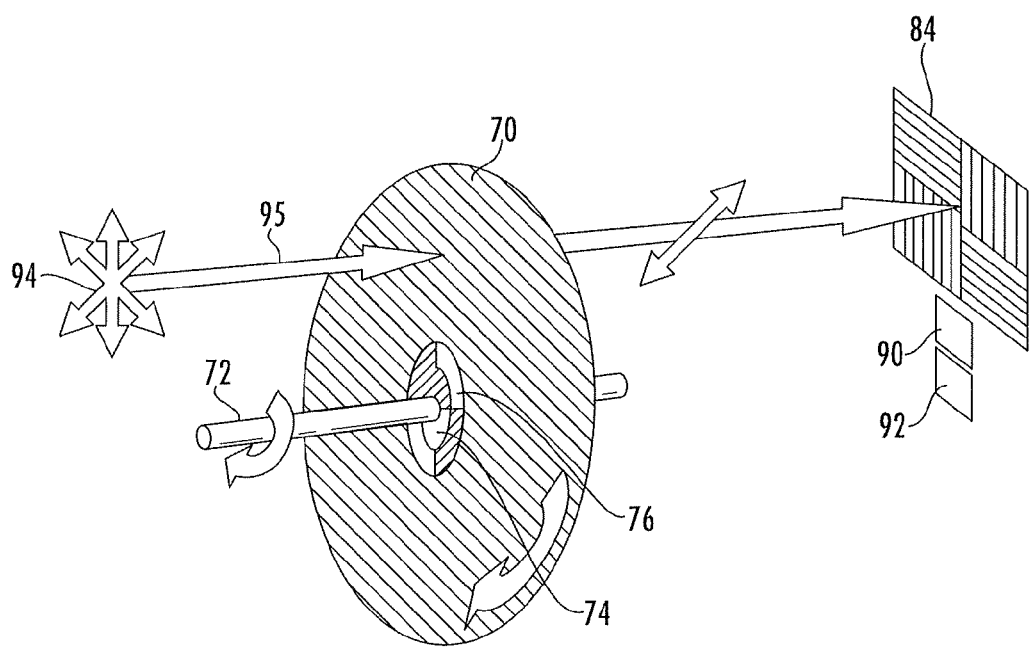
FIG. 11 illustrates a perspective view of the encoder of FIG. 10.

A further illustration of this embodiment is shown in FIG. 11 where the polarizer of the polarization sensing means for illustration comprises a common centroid arrangement of sensors with opposite alignments. Again a light source 94 provides unpolarized light 95 which is then polarized by the polarizing disk 70. For detection by the polarization sensor 84, track sensors 90, 92 are provided for sensing the square wave or sign wave variations of the transmitted intensity of the each track 74, 76 as described before.

The electric field $\Psi$ of a linearly polarized electro-magnetic wave with polarization of $\Theta$ to the x axis, may be expressed as:

$$\begin{pmatrix} \Psi_x \\ \Psi_y \end{pmatrix} \propto \begin{pmatrix} \cos\Theta \\ \sin\Theta \end{pmatrix}$$

An unpolarized sensor will detect both components of the radiation, however an ideal polarized sensor will detect only one. For example, a polarization sensor in the x axis will detect $\Psi_X$ and one in the y axis will detect $\Psi_Y$.

The energy of the radiation is proportional to the square of the field strength [3]

$$E = (\epsilon_0 \times \Psi^2)/2$$

where $\epsilon_0$ is the permittivity of free space (8.854E−12 F/m)

Hence:

Energy received by X-axis polarization detector $\propto \cos^2 \Theta$

Energy received by Y-axis polarization detector $\propto \sin^2 \Theta$

From trigonometry $\cos^2 \Theta = 1 + \cos(2\Theta)$ and $\sin^2 \Theta = 1 - \cos(2\Theta)$ Hence the output from the X-axis polarization detector $$I_x \propto 1 + \cos(2\Theta)$$

and similarly, the output from the Y-axis polarization detector $$I_y \propto 1 - \cos(2\Theta)$$

The polarization contrast can therefore be said to be proportional to $2\Theta$. As the shaft rotates so does the polarization grating. A reading of the polarizer's orthogonal sections are made and the polarization contrast can be calculated. This value can then be compared to the theoretical value either from a look-up table or using an additional non polarized pixel on the sensor whose intensity value could be used to calculate the constant of proportionality. This method would require an additional pixel, but would also ensure that the system is intensity independent. Then, using the readings from the two code tracks the absolute rotary angle can be calculated.

Figure 12:
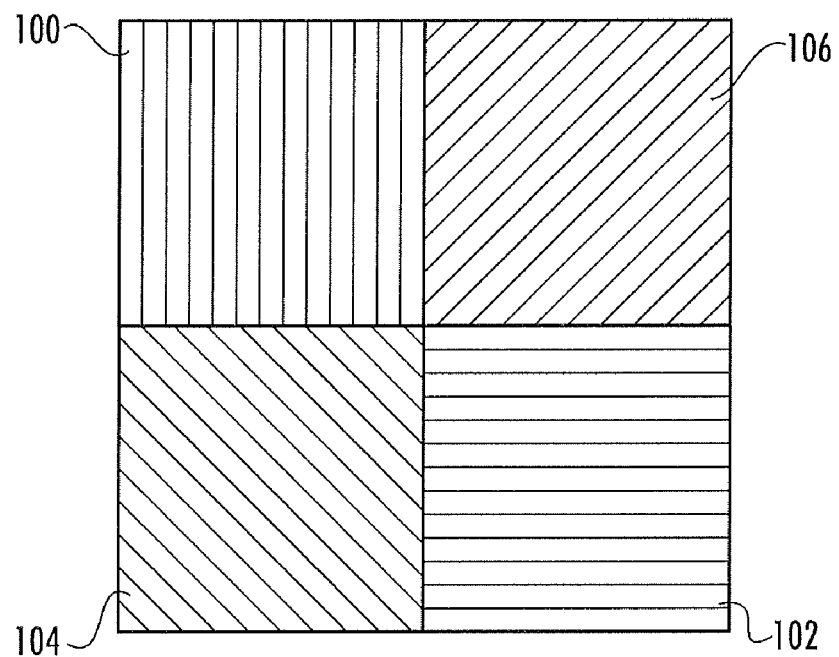
FIG. 12 illustrates a further example polarizer forming part of a polarization sensing means according to the invention.

In a further embodiment, a secondary orientation sensor comprises a modified polarizer in the polarization sensing means, together with a single track formed on the polarizer disk. A suitable polarizer for the polarization sensing means is shown in FIG. 12. A first pair or polarizers 100,102 are provided with orthogonal directions of polarization, and a second pair of polarizers 104,106 are provided which have orthogonal directions of polarization with respect to each other, but which are offset with respect to the first pair 100,102 by forty-five degrees.

A first polarization contrast $I_{PC}$ as calculated with respect to the first pair 100,102 is measured, and a second polarization contrast $I_{PC}$ as calculated with respect to the second pair 104,106 is measured. The first polarization contrast has a four-way ambiguity as described before, but the four possible results gained from analysis of the first polarization contrast correspond to only two results gained from analysis of the second polarization contrast. Therefore, the four-way ambiguity can be reduced to a two-way ambiguity by the polarizer layout of FIG. 12. This remaining two-way ambiguity can then be resolved by the use of a single track formed on the polarizer disk giving a one bit readout which identifies the different halves of the polarizer disk. Further improvements may be yielded by the construction of more complex polarizer structures, comprising more than two pairs of orthogonally opposite polarizers.

As for previous polarizers mentioned above, the polarizer of FIG. 12, the polarizers can be formed as wire grids with appropriate diffractive properties in the case of an integrated polarizer and image sensing structure, or as a regular H-sheets or J-sheets in the case of non-integration of the polarizer and image sensing structure. Also, image sensing pixels can be provided in a one-to-one relationship with each polarizing section. Alternatively, each polarizer section may have a plurality of pixels provided for measuring the intensity of radiation transmitted through each polarizer section.

For all the above embodiments, the polarizing disk can be formed cheaply as it can use standard polarizing materials such as an h-sheet or j-sheet polarizer such as that provided by the Polaroid Corporation. Also, the rotary encoders as described above remove the need for expensive coded etched disks.

Figure 13:
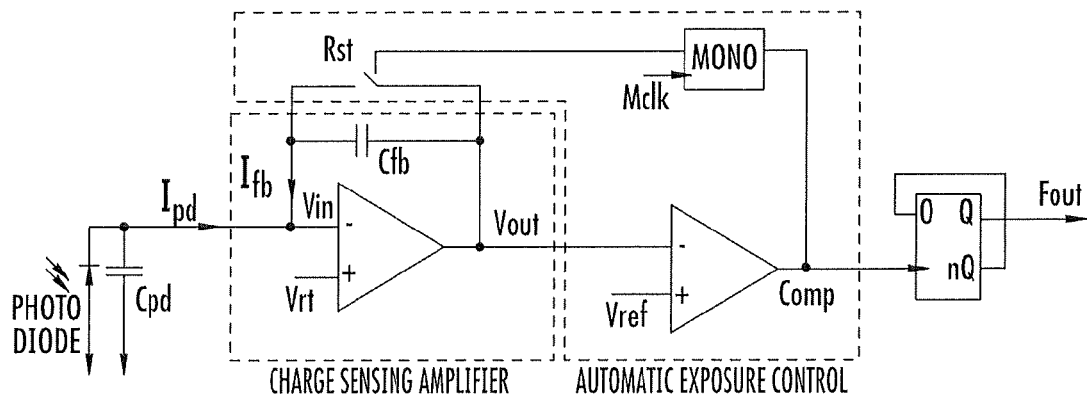
FIG. 13 illustrates a light to frequency convertor pixel architecture, formed as an image sensing structure according to the invention.
Figure 14:
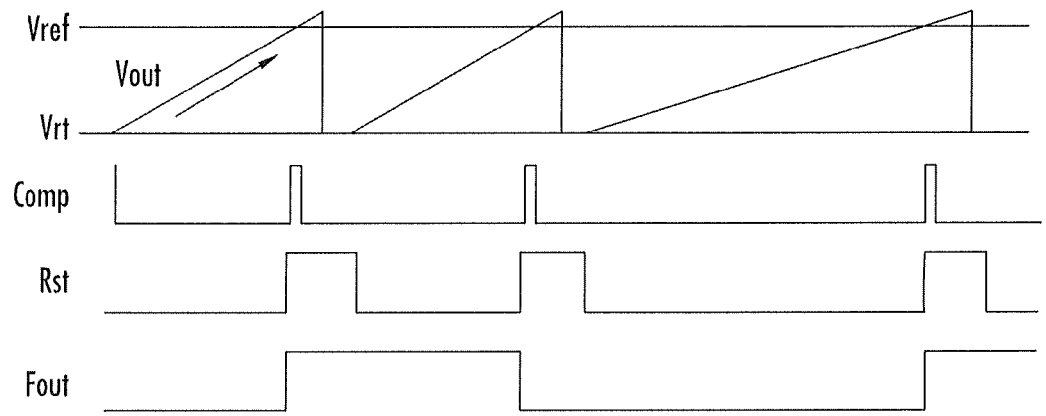
FIG. 14 is a timing diagram illustrating the operation of the circuit of FIG. 13.

Any type of image sensor may be used as part of the polarization sensing means and for the other sensors. However, one type that is advantageous for this application is a light to frequency light converter of the type illustrated in FIGS. 13 and 14, as it exhibits better integration capacitance tolerance between pixels compared to standard CMOS sensors and it can have a large photodiode without having the large associated integrated capacitor. Instead, a small integration capacitor may be used with a large photodiode increasing the sensitivity of the pixel. Light to frequency converters are described for example in U.S. patent application Ser. No. 11/148,930, hereby incorporated by reference.

A rotary encoder formed according to any of the embodiments described above may be used in a wide variety of devices, including without limitation office equipment such as printers, photocopiers, fax machines, and computer peripherals such as optical pointing devices including optical mice and trackballs, or for automotive or aerospace telemetry systems. Various improvements and modifications can be made to the above without departing from the spirit or the scope of this disclosure. In particular, where a plurality of light sources are illustrated they may be replaced by a single light source. Also, references are made to a polarizer disk, but it is to be realized that the scope of protection is not to be limited to polarizers that are strictly circular in cross-section. Eccentric or other irregularly shaped polarizers may be used if the device in which the rotary encoder is to be used so allows.

That which is claimed is:

1. An optical rotary encoder for measuring an angular position of a rotatable member, the optical rotary encoder comprising:
    a light source;
    a polarization sensor comprising a polarizer and an image sensor; and
    a polarizer disk fixed to the rotatable member and interposed between said light source and said polarization sensor.

2. The optical rotary encoder of claim 1, wherein said light source emits unpolarized light.

3. The optical rotary encoder of claim 1, wherein said polarization sensor comprises a processor for measuring an intensity signal and comparing the intensity signal with a known variation of intensity with an angle of rotation of the rotatable member to determine one or more angles of rotation that correspond to the measured intensity.

4. The optical rotary encoder of claim 1, wherein the polarizer of said polarization sensor polarizes light in at least one direction of polarization.

5. The optical rotary encoder of claim 1, wherein the polarizer of said polarization sensor comprises at least one first polarizing section for polarizing light in a first direction and at least one second polarizing section for polarizing light in a second direction; wherein the first and second directions are orthogonal to each other.

6. The optical rotary encoder of claim 5, wherein the polarizer of said polarization sensor further comprises a plurality of the first polarizing section and a plurality of the second polarizing section arranged in a common centroid arrangement.

7. The optical rotary encoder of claim 6, wherein the common centroid arrangement is repeated a number of times across a surface of the polarizer of said polarization sensor.

8. The optical rotary encoder of claim 5, wherein the image sensor comprises an image sensing pixel; and wherein the image sensing pixel is provided for each polarizing section.

9. The optical rotary encoder of claim 5, wherein the image sensor comprises a plurality of image sensing pixels; and wherein the plurality of image sensing pixels are provided for each polarizing section.

10. The optical rotary encoder of claim 1, wherein said polarizer disk comprises at least one of h-sheet polaroid material and j-sheet polaroid material.

11. The optical rotary encoder of claim 1, wherein the polarizer of said polarization sensor is integrated with the image sensor.

12. The optical rotary encoder of claim 1, wherein the polarizer of said polarization sensor comprises a plurality of parallel metal lines on a surface of the image sensor.

13. The optical rotary encoder of claim 12, wherein the polarizer of said polarization sensor comprises at least one of h-sheet polaroid material and j-sheet polaroid material.

14. The optical rotary encoder of claim 1, wherein the image sensor comprises at least one light-to-frequency converter type pixels.

15. The optical rotary encoder of claim 1, further comprising an orientation sensor for uniquely identifying quadrants of said polarizer disk.

16. The optical rotary encoder of claim 15, wherein said orientation sensor comprises two tracks on said polarizer disk, together with an image sensor associated with each track as part of said polarization sensor.

17. The optical rotary encoder of claim 16, wherein each of the tracks comprises alternating clear and opaque portions.

18. The optical rotary encoder of claim 17, wherein the alternating clear and opaque portions are in a gray code arrangement with respect to signals detected by the image sensors with the tracks between successive quadrants of said polarizing disk.

19. The optical rotary encoder of claim 15, wherein said orientation sensor comprises:
    a track on said polarizer disk, together with an associated image sensor being part of said polarization sensor; and
    a second polarizer being part of said polarization sensor and comprising
        first and second polarizer sections having respective orthogonal directions of polarization, and
        third and fourth polarizer sections having respective orthogonal directions of polarization, the directions of polarization of the first and second sections being offset with respect to the directions of polarization of the third and fourth sections by forty-five degrees.

20. An optical rotary encoder for measuring an angular position of a rotatable member comprising:
    a light source;
    an optical stack comprising
        a polarization sensor, said polarization sensor comprising an integrated polarizer and an image sensor; and
        a polarizer disk fixed to the rotatable member and interposed between said light source and the polarization sensor.

21. The optical rotary encoder of claim 20, wherein the integrated polarizer comprises a plurality of parallel metal lines on a surface of the image sensor.

22. An optical rotary encoder for measuring an angular position of a rotatable member comprising:
    a light source;
    a polarization sensor comprising a polarizer and a plurality of image sensors; and a polarizer disk fixed to the rotatable member and comprising a plurality of tracks of alternating clear and opaque portions, said polarization disk being interposed between said light source and said polarization sensor, each image sensor being associated with one of the tracks on said polarizer disk.

23. The optical rotary encoder of claim 22, wherein the alternating clear and opaque portions are in a gray code arrangement with respect to signals detected by the image sensors with the tracks being between successive quadrants of said polarizing disk.

24. An optical rotary encoder for measuring an angular position of a rotatable member, the optical rotary encoder comprising:

a light source;

a polarization sensor comprising a polarizer and an image sensor; and a polarizer disk fixed to the rotatable member and interposed between said light source and said polarization sensor;

said polarization sensor using a polarization difference imaging technique.

25. An electronic apparatus comprising:

a device including a spool fitted with an optical rotary encoder for measuring an angular position of the spool, the encoder comprising a light source, a polarization sensor comprising a polarizer and an image sensor, and a polarizer disk fixed to the spool and interposed between said light source and said polarization sensor.

26. The electronic apparatus of claim 25, wherein said device comprises at least one of a printer, a photocopier, an optical pointing device, an aeronautic telemetry system, and an automobile telemetry system.

* * * * *

UNITED STATES PATENT AND TRADEMARK OFFICE
CERTIFICATE OF CORRECTION

| | | |
|---|---|---|
| PATENT NO. | : 7,777,879 B2 | |
| APPLICATION NO. | : 11/670179 | |
| DATED | : August 17, 2010 | |
| INVENTOR(S) | : Baxter et al. | |

It is certified that error appears in the above-identified patent and that said Letters Patent is hereby corrected as shown below:

Column 1, Line 22  Delete: "need replaced"
Insert: --need to be replaced--

Column 1, Line 47  Delete: "pass the"
Insert: --pass--

Column 1, Line 53  Delete: "a known a"
Insert: --a known--

Column 1, Line 65  Delete: "need"
Insert: --needed--

Column 2, Line 20  Delete: "due"

Column 2, Line 64  Delete: "with"
Insert: --with the--

Signed and Sealed this
Nineteenth Day of July, 2011

David J. Kappos
*Director of the United States Patent and Trademark Office*